United States Patent
Kim et al.

(10) Patent No.: US 7,113,694 B2
(45) Date of Patent: **\*Sep. 26, 2006**

(54) APPARATUS FOR CREATING AND MANAGING NAVIGATION INFORMATION IN REWRITABLE RECORDING MEDIUM AND METHOD THEREFOR

(75) Inventors: Byung-Jin Kim, Kyunggido (KR); Kang-Soo Seo, Kyunggido (KR)

(73) Assignee: LG Electronics Inc., Seoul (KR)

( * ) Notice: Subject to any disclaimer, the term of this patent is extended or adjusted under 35 U.S.C. 154(b) by 991 days.

This patent is subject to a terminal disclaimer.

(21) Appl. No.: 09/862,772

(22) Filed: May 21, 2001

(65) Prior Publication Data

US 2001/0036358 A1    Nov. 1, 2001

Related U.S. Application Data

(63) Continuation-in-part of application No. 09/846,802, filed on Apr. 30, 2001, now Pat. No. 6,631,387, which is a continuation of application No. 09/245,857, filed on Feb. 8, 1999, now Pat. No. 6,301,587.

(30) Foreign Application Priority Data

Aug. 18, 1998    (KR)    ................................ 98-33856

(51) Int. Cl.
   *H04N 5/91*    (2006.01)
(52) U.S. Cl. ........................................ 386/95; 386/126
(58) Field of Classification Search ................ 386/46, 386/95, 125, 126; 707/205
   See application file for complete search history.

(56) References Cited

U.S. PATENT DOCUMENTS

| | | | |
|---|---|---|---|
| 5,596,564 A | 1/1997 | Fukushima et al. ...... 369/275.3 |
| 5,619,338 A | 4/1997 | Nakai et al. .................. 386/70 |
| 5,764,846 A | 6/1998 | Hirayama et al. ............ 386/92 |
| 5,778,142 A | 7/1998 | Taira et al. .................... 386/97 |
| 5,793,872 A | 8/1998 | Hirayama et al. ............ 386/95 |
| 5,930,450 A | 7/1999 | Fujita ........................... 386/95 |
| 5,956,457 A | 9/1999 | Hirayama et al. ............ 386/92 |
| 5,963,704 A | 10/1999 | Mimura et al. ............... 386/95 |
| 6,067,400 A | 5/2000 | Saeki et al. ................... 386/95 |
| 6,078,727 A | 6/2000 | Saeki et al. ................. 386/125 |
| 6,108,281 A | 8/2000 | Tozaki et al. ................. 369/32 |
| 6,122,436 A | 9/2000 | Okada et al. ............... 386/126 |
| 6,125,232 A | 9/2000 | Taira et al. .................... 386/95 |
| 6,160,952 A | 12/2000 | Mimura et al. ............... 386/95 |
| 6,631,387 B1 * | 10/2003 | Kim et al. ................... 707/205 |
| 6,895,171 B1 * | 5/2005 | Taira et al. .................... 386/95 |

FOREIGN PATENT DOCUMENTS

| | | | |
|---|---|---|---|
| JP | 7334977 | 12/1995 | .................... 27/10 |
| JP | 9213013 | 8/1997 | .................... 20/12 |

* cited by examiner

*Primary Examiner*—Huy Nguyen
(74) *Attorney, Agent, or Firm*—Lee, Hong, Degerman, Kang & Schmadeka

(57) ABSTRACT

An audio recording apparatus provides a method of managing the video and audio navigation data for a rewritable recording medium, such as DVDs. The recording medium contains video and audio files in either originally recorded or user defined sequence. During recording, the apparatus prepares and updates start addresses for each navigation table containing such data as video and audio files. When reproducing information from the recording medium, the information tables which contain management data required for reproduction of the requested data are located directly by the start addresses. The data are read from the rewritable recording medium and reproduced in reference to the management data.

20 Claims, 8 Drawing Sheets

FIG. 1

| Video Manager Information (VMGI) | Video Manager Information Management Table (VMGI_MAT) | RTRWI_EA |
| --- | --- | --- |
| | | VMGI_EA |
| | | ........ |
| | Play List Search Pointer Table (PL_SRPT) | |
| Movie AV File Information Table (M_AVFIT) | Movie AV File Information Table Information (M_AVFITI) | M_AVFIT_EA |
| | | ........ |
| | Movie AV File Information (M_AVFI) | |
| Still Picture AV File Information Table (S_AVFIT) | Still Picture AV File Information Table Information (S_AVFITI) | S_AVFIT_EA |
| | | ........ |
| | Still Picture AV File Information (S_AVFI) | |
| Original PGC Information Table (ORG_PGCIT) | Original PGC Information Table Information (ORG_PGCITI) | ORG_PGCIT_EA |
| | | ........ |
| | Original PGC Search Pointer (ORG_PGCI_SRP) | |
| | Original PGC Information (ORG_PGCI) | |
| User Defined PGC Information Table (UD_PGCIT) | User Defined PGC Information Table Information (UD_PGCITI) | UD_PGCIT_EA |
| | | ........ |
| | User Defined PGC Search Pointer #i (UD_PGCI_SRP#i) | |
| | User Defined PGC Information (UD_PGCI#i) | |
| Text Data Manager (TXT_DT_MG) | Text Data Information (TXTDTI) | TXT_DT_MG_EA |
| | | ........ |
| | Item Text Search Pointer #i (IT_TXT_SRP#i) | |
| | Item Text #i (IT_TXT#i) | |
| Manufacturer's Information Table (MNFIT) | Manufacturer's Information Table Information (MNFITI) | MNFIT_EA |
| | | ........ |
| | Manufacturer's Information Search Pointer #i (MNFI_SPR #i) | |
| | Manufacturer's Information #i (MNFI#i) | |

~10

*Conventional Art*

FIG. 2

| | VMG_ID |
| --- | --- |
| | RTRWI_EA |
| VMGI_MAT | VMGI_EA |
| | VERN |

*Conventional Art*

*Conventional Art*

APPARATUS FOR CREATING AND MANAGING NAVIGATION INFORMATION IN REWRITABLE RECORDING MEDIUM AND METHOD THEREFOR

CROSS REFERENCE TO RELATED ART

This application claims the benefit of Korean Patent Application No. 1998-33856, filed on Aug. 18, 1998, which is hereby incorporated by reference in its entirety.

This is a continuation-in-part of application Ser. No. 09/245,857, filed Feb. 8, 1999, now U.S. Pat. No. 6,631,387 which is hereby incorporated by reference in its entirety; and application Ser. No. 09/846,802, filed Apr. 30, 2001 which is a continuation of application Ser. No. 09/245,857, filed Feb. 8, 1999, now U.S. Pat. No. 6,301,587, both of which claim the benefit of Korean Patent Application No. 1998-33856, filed on Aug. 18, 1998.

BACKGROUND OF THE INVENTION

1. Field of the Invention

The present invention relates generally to rewritable recording media, and more particularly, to an apparatus and method for efficient management of navigation information on a rewritable recording medium when the data on the recording medium are recorded, edited and reproduced.

2. Discussion of the Related Art

Optical discs have come into wide use since the advent of compact disc (CD) and the demand for optical discs is expected to grow steadily with popularization of digital versatile disc (DVD). Optical discs include read-only discs, such as CD-ROM and DVD-ROM, write-once discs, such as CD-R and DVD-R, and rewritable discs, such as CD-RW and DVD-RAM. The specification of DVD-RTRW, which is standard writing/reading format of a rewritable disc, has not been released yet and standardization for DVD-RTRW is in progress.

As rewritable optical discs like DVD-RAM are of immensely large capacity, users may store a variety of data such as moving pictures, still pictures, audio data, and the like on a single recording medium. Each time a new data file is recorded on a rewritable recording medium, navigation information for locating the data file after the recording is created and recorded along with the data file on the recording medium. The recorded navigation information is referred to whenever the relevant data file is accessed.

Navigation information regarding all video data files stored on a recording medium is contained in a video navigation data table 10 as shown in FIG. 1, which is recorded as a single data file on the recording medium. Similarly navigation information regarding all audio data files stored on a recording medium is contained in an audio navigation data table substantially identical to the video navigation data table 10.

Accessing the recording medium entails loading the navigation data file into a memory, wherein the navigation data reside all the time. When recording a moving or still picture on the recording medium, the area in which the picture file will be recorded is determined with reference to the navigation information. Recording a picture file always accompanies creating management information regarding the recorded picture file and updating the navigation data file to include the newly created management information.

Navigation data pertaining to moving pictures comprise movie video object information (M_VOBI) and movie video object presentation order information (movie or audio Cell Information or simply CI). Suppose that a moving picture file is composed of n movie video objects (M_VOBs), e.g., M_VOB#1~M_VOB#n as shown in FIG. 3. Since each M_VOB needs a M_VOBI and a CI, n M_VOBIs and n CIs are created in the same order that n M_VOBs are recorded. In FIG. 3, M_VOBI#1~M_VOBI#n correspond to M_VOB#1~M_VOB#n and C#3, . . . , C#k (shaded cells in the box labeled ORG_PGC) correspond to M_VOB#1~M_VOB#n. The created M_VOBIs and CIs are stored in the movie A/V file information table (M_AVFIT) and the original program chain information table (ORG_PGCIT) of the navigation data shown in FIG. 1, respectively.

On the other hand, the navigation data pertaining to still pictures comprise still picture video object information (S_VOBI) and still picture video object presentation order information (still picture Cell Information or simply CI). Suppose that a still picture file is composed of n still picture video objects (S_VOBs) S_VOB#1~S_VOB#n as shown in FIG. 3. Since each S_VOB needs a S_VOBI and a CI, n S_VOBIs and n CIs are created in the same order that n S_VOBs are recorded. In FIG. 3, S_VOBI#1~S_VOBI#n correspond to S_VOB#1~S_VOB#n and C#1, C#2, C#4, . . . , C#(k-1) (not shaded Cells in the box labeled ORG_PGC) correspond to S_VOB#1~S_VOB#n. The created S_VOBIs and CIs are stored in the still picture A/V file information table (S_AVFIT) and the original program chain information table (ORG_PGCIT) of the navigation data shown in FIG. 1, respectively.

When the rewritable recording medium is accessed for reproduction, the navigation data file is read out from the recording medium and loaded into a memory. If reproduction of a moving picture (still picture) is requested, M_VOBIs (S_VOBIs) and CIs relevant to the requested moving picture file (still picture file) are read from the M_AVFIT (S_AVFIT) and ORG_PGCIT of the navigation data table, respectively. With reference to the M_VOBIs (S_VOBIs) and CIs, the requested moving picture file (still picture file) can be located from the recording medium and reproduced.

The navigation data file is used in the same manner when a moving or still picture files recorded on the recording medium is edited. If a user edits a play list of moving or still pictures to reproduce them in a preferred order, management data regarding the changed play list are created with reference to the navigation data loaded into the memory. The management data consist of a new series of CIs corresponding to the selected pictures, e.g., C#1'~C#m' of FIG. 3, which forms a user-defined PGC (UD_PGC) to be stored in the user-defined PGC information (UD_PGCI) of the UD_PGCIT shown in FIG. 1. UD_PGC#i is stored in UD_PGCI#i (i=1,2, . . . , n).

If reproduction of the edited play list of the picture files is requested, the UD_PGC stored in the UD_PGCI corresponding to the requested play list is read from the UD_PGCIT of the navigation data in the memory. Then, the M_VOBIs and S_VOBIs corresponding to the CIs in the UD_PGC can be read from the M_AVFIT and S_AVFIT. For example, in FIG. 3, S_VOBI#2~S_VOBI#4, S_VOBI#7~S_VOBI#8, . . . , M_VOBI#6~M_VOBI#8 are read out. Finally, the VOBs linked to the play list can be read out and the play list can be reproduced in reference to the VOBIs and CIs.

In the video navigation data table 10 configured as above, the video manager information management table (VMGI_MAT) comprises, as shown in FIG. 2, a video manager identifier (VMG_ID) for representing a navigation data file; an address (RTRWI_EA) for specifying the end address of the navigation data table which is represented by a relative logical block number from the beginning of the table; an address (VGMI_EA) for specifying the end address of the video manager information (VGMI) which is represented by a relative byte number from the beginning of the VGMI; and a version number (VERN) of the rewritable recording medium.

As shown in FIG. 1, each information table has an address field which indicates the end address of the information table: M_AVFIT_EA in movie A/V file information table information (M_AVFITI) specifies the end of M_AVFIT, S_AVFIT_EA in still picture A/V file information table information (S_AVFITI) for S_AVFIT, ORG_PGCIT_EA in original PGC information table information (ORG_PGCITI) for ORG_PGCIT, UD_PGCI_EA in user-defined PGC information table information (UD_PGCITI) for UD_PGCIT, TXT_DT_MG_EA in text data information (TXTDTI) for text data manager (TXT_DT_MG), and MNFIT_EA in manufacturer's information table information (MNFINI) for manufacturer's information table (MNFIT).

For example, in order to access the original PGC information (ORG_PGCI) of the navigation data of FIG. 1, first, the end address of VMGI, or VMGI_EA is read out from VMGI_MAT of VMGI. The M_AVFIT is located in reference to the VMGI_EA because M_AVFIT is the next information table of VMGI. Then, M_AVFIT_EA is read out from M_AVFITI of M_AVFIT. In the same way, S_AVFIT_EA is obtained from S_AVFITI of S_AVFIT in reference to the M_AVFIT_EA, and then the ORG_PGCI is accessed by referencing the next address of the S_AVFIT_EA.

Therefore, the navigation data file structure, where the end addresses for the information tables, such as VMGI_EA, M_AVFIT_EA, S_AVFIT_EA, ORG_PGCIT_EA, UD_PGCIT_EA, TXT_DT_MG_EA, and MNFIT_EA, are used for locating, must be loaded in a memory in such a way that the information tables such as VMGI, M_AVFIT, S_AVFIT, ORG_PGCIT, UD_PGCIT, TXT_DT_MG, and MNFIT are arranged contiguously in order to access each information table appropriately.

In addition, when some data, for example, moving pictures are written to the rewritable recording medium, M_VOBI#i and C#i are generated corresponding to the M_VOB#i to be recorded newly and are then written to M_AVFIT and ORG_PGCIT, respectively. Since the information tables in the video navigation data table 10 are arranged on the memory contiguously, as shown in FIG. 4A, writing the generated M_VOBI#i into M_AVFIT requires that information tables after the M_AVFIT be moved back by the size of the M_VOBI#i (shaded area in M_AVFIT in FIG. 4B), as shown in FIG. 4B. After writing the M_VOBI#i is completed, the end addresses of the M_AVFIT and information tables thereafter are updated. Likewise, in order to write the C#i into ORG_PGCIT, it is required that information tables positioned after the ORG_PGCIT are moved back by the size of the C#i (shaded area in ORG_PGCIT in FIG. 4B). Writing the C#i into ORG_PGCIT is followed by updating the end addresses of ORG_PGCIT and information tables thereafter.

In other words, in the prior navigation data file structure, it takes more reading-and-writing cycle of information tables in the memory to write management information to the navigation data, which is generated when data are written to a rewritable recording medium. As a result, updating management data requires more time for memory operation.

Because, in the prior navigation data file structure, access to the information tables in the navigation data such as M_AVFIT, S_AVFIT, ORG_PGCIT, UD_PGCIT, TXT_DT_MG, and MNFIT is made through a series of referencing the end addresses of preceding information tables, the access time is rather long and thereby it may be a burden to real-time operation for writing/reproducing data to/from the rewritable recording medium.

SUMMARY OF THE INVENTION

Accordingly, the present invention is directed to an apparatus and method of managing navigation information in a rewritable recording medium that substantially obviates one or more of the problems due to limitations and disadvantages of the related art.

It is therefore a primary object of the present invention to provide an effective method of managing navigation data which are referred to when data on the recording medium are recorded, edited and reproduced, by offering a new navigation data structure in which direct access to the information tables in the navigation data table is allowed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The method of managing the navigation data for the rewritable recording medium according to the present invention is characterized in that it comprises steps of writing management information, which is asked to be updated due to writing/editing data or change of presentation order, to the relevant information tables in the navigation data; checking whether or not the adjustment of positions of the information tables on the navigation data is required to write the relevant management information; and altering the start locations of the information tables whose locations are to be adjusted, according to the examination result.

The management method of the navigation data according to the present invention is further characterized in that it comprises steps of loading the navigation data recorded on the rewritable recording medium onto a memory; generating management data depending on the data type and the type of presentation control, when recording, reproduction, or editing is requested; reading the start address information of the information tables, which are relevant to the generated management data, from the navigation data on the memory; and writing the generated management data to an appropriate location of each of the relevant information tables based on the start address information.

Furthermore, in order to achieve the above object, there is provided an audio recording apparatus for use with a recording medium to record data thereon. The apparatus comprises means for recording user data onto at least one data area of the recording medium; means for recording a navigation data table onto a navigation data area, the navigation data table containing a plurality of navigation information, at least one of the plurality of navigation information being associated with the user data recorded in the data area and at least one of the plurality of navigation information being associated with presentation control information, wherein the navigation data table includes start address information associated with at least one of the plurality of navigation information; means for checking whether a start address of at least one of the plurality of navigation information has been changed; and means for altering the start address information in the navigation data table in response to the change in the start address of at least one of the plurality of navigation information.

According to one aspect of the present invention, the apparatus comprises a signal pickup unit to record information onto the recording medium; an analog signal processor to produce analog signal from digitize data; a digital signal processor to provide the digitized data to the analog signal processor; and a control unit to record the user data onto the recording medium.

According to one aspect of the present invention, the navigation data table is recorded as a single file. Preferably, the plurality of navigation information recorded in the navigation data area includes an audio file information table, an audio still video file information table, a sequential presentation information table, and/or a prescribed-order presentation information table.

According to another aspect of the present invention, the presentation control information recorded in the plurality of navigation information comprises a sequential presentation information table containing management information for reproducing data in a recording order; and a prescribed-order presentation information table containing management information for reproducing data in a user-defined order.

According to another aspect of the present invention, each of the start address information of the navigation data table is represented by a relative positional information from the beginning of the navigation data table. The start address information of the navigation data table may include start addresses of the audio file information table, the audio still video file information table, the sequential presentation information table, the prescribed-order presentation information table, the text data manager information table and/or the manufacturer's information table.

A method of creating and writing navigation data on a recording medium comprises the steps of: recording user data onto at least one data area of the recording medium; recording a navigation data table onto a navigation data area, the navigation data table containing a plurality of navigation information, at least one of the plurality of navigation information being associated with the user data recorded in the data area and at least one of the plurality of navigation information being associated with presentation control information, wherein the navigation data table includes start address information associated with at least one of the plurality of navigation information; checking whether a start address of at least one of the plurality of navigation information has been changed; and altering the start address information in the navigation data table in response to the change in the start address of at least one of the plurality of navigation information.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

FIG. 1 is a table showing a video navigation data file for managing data recorded on a rewritable recording medium;

FIG. 2 is a table showing the prior configuration of the video manager information table (VGMI_MAT) shown in FIG. 1;

DETAILED DESCRIPTION OF THE PREFERRED EMBODIMENTS

The preferred embodiment of the present invention will be described in detail referring to the accompanying drawings. In the following description, reference is made to the accompanying drawings which form a part hereof and which illustrate the preferred embodiment of the present invention. It is understood that other embodiments may be utilized and structural and operational changes may be made without departing from the scope of the present invention. For example, although the preferred embodiments are described in the context of video data, the present application can equally be applied to audio and the combination of audio and video data. In particular, any reference to "video" in FIGS. 1 to 4B may be substituted with "audio." For example, the Video Manager Information (VMGI) may be substituted with Audio Manager Information (AMGI); and the Movie AV File Information Table (M_AVFIT) may be substituted with Audio File Information Table (AUDFIT); and Still Picture AV File Information Table (S AVFIT) may be substituted with Audio Still Video File Information (AS-VFIT). Similarly, with respect to FIG. 3, S_VOB may be substituted with ASVOB, and MVOB may be substituted with AOB. Additional details concerning the audio navigation data format will be discussed with respect to FIGS. 7 and 8.

Figure 5:
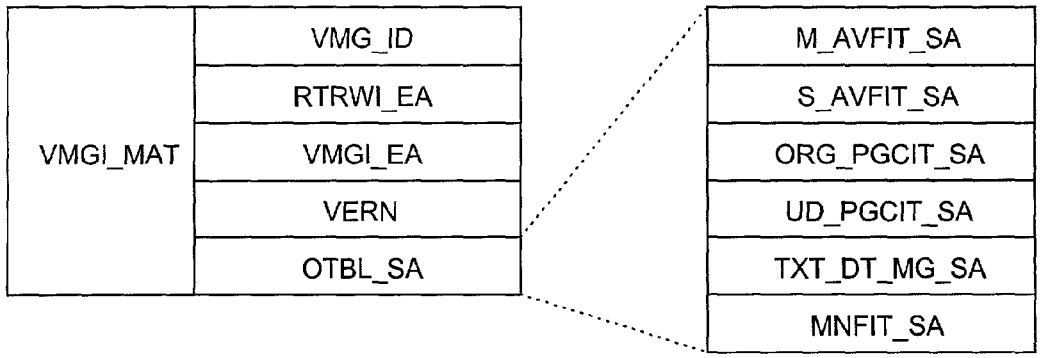
FIG. 5 is a configuration of the video manager information table (VMGI_MAT) according to the present invention.

FIG. 5 depicts an embodiment of the VMGI_MAT of the video navigation file structure for a rewritable recording medium in accordance with the present invention. The VMGI_MAT differs from the prior VMGI_MAT of FIG. 2 in that, in addition to VMG_ID, RTRWI_EA, VMGI_EA, and VERN, the present invention further includes an additional field, OTBL_SA where start addresses of the information tables except VMGI_MAT, i.e., M_AVFIT, S_AVFIT, ORG_PGCIT, UD_PGCIT, TXT_DT_MG, and MNFIT are stored. The start addresses are denoted by M_AVFIT_SA (for M_AVFIT), S_AVFIT_SA (for S_AVFIT), ORG_PGCIT_(for ORG_PGCIT), UD_PGCIT_SA (for UD_PGCIT), TXT_DT_MG_SA (for TXT_DT_MG), and MNFIT_SA (for MNFIT), respectively. Preferably, each start address may be represented by a relative byte number from the beginning of the navigation data table of FIG. 1. Alternatively, the start addresses may be represented by using relative byte number or displacement from any arbitrary starting address of the memory or the recording medium.

In the navigation data file configured as above, each information table can be accessed by only reading out its own start address from the OTBL_SA of the first information table or VMGI_MAT, and referencing the address.

Figure 6:
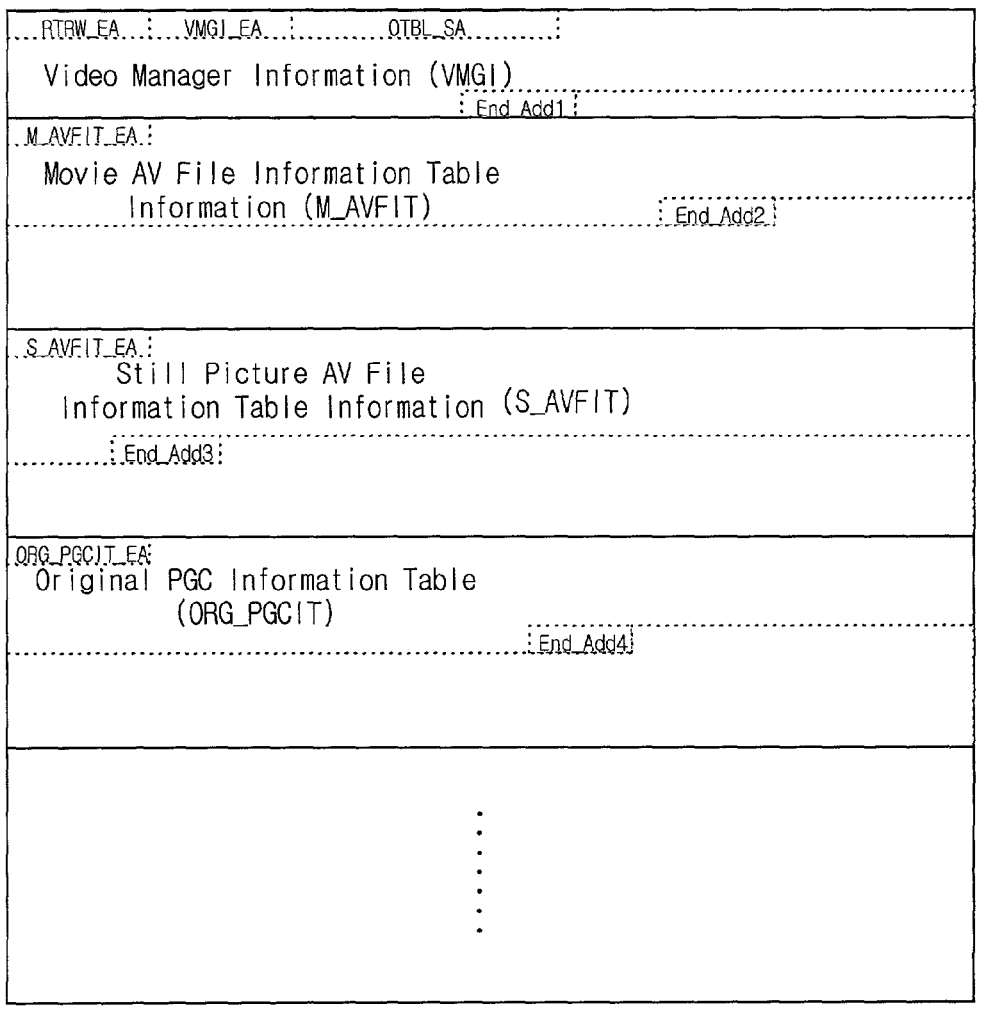
FIG. 6 is a schematic diagram illustrating the process of writing video object information and video object presentation order information to information tables of the video navigation data table having a structure according to the present invention.

Thus, each information table need not be arranged contiguously on the memory or the recording medium, as in the prior navigation data structure. For example, the start addresses kept in the OTBL_SA of VMGI_MAT can be chosen such that the information tables in the navigation data are arranged apart from each other with a predetermined spacing (shaded area in each information table of FIG. 6), as shown in FIG. 6. In this case, it is possible to write data into one or more of the information tables without moving back the information tables thereafter in order to make sufficient area for the data.

The navigation data structure according to the present invention includes the prior navigation data structure. That is, the start addresses may be set such that the information tables are positioned contiguously. As a result, when writing data into the information table(s) in the navigation data table, it is inevitable to move back the information tables which follows the information table(s), as in the prior navigation data structure. In this case, however, it requires no manipulation of the end addresses of the preceding information tables to access the information tables to be moved.

Figure 7:
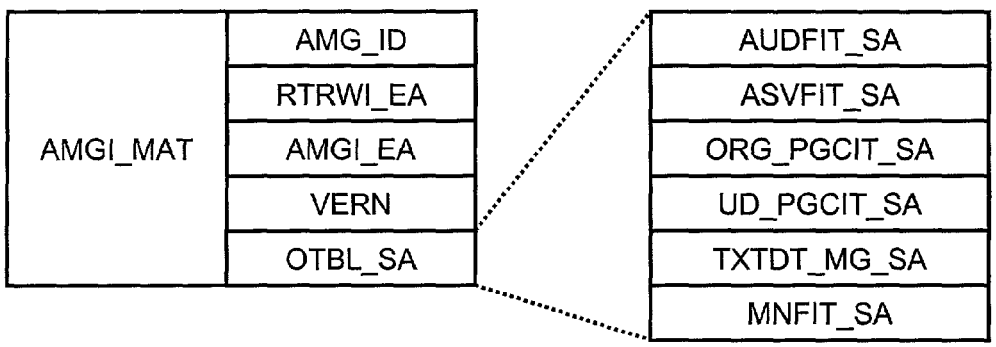
FIG. 7 is a configuration of the audio manager information table (AMGI_MAT) according to the present invention.

FIG. 7 is a configuration of the audio manager information table (AMGI_MAT) according to the present invention. The AMGI_MAT is part of the AMGI (Audio Manager Information) which is part of the audio navigation data table 100 (shown in FIG. 8) having the substantially same configuration as the video navigation data table 10 of FIG. 1. The AMGI_MAT structure is similar to the VMGI_MAT structure shown in FIG. 5, except that the AMGI_MAT is for the audio related files.

According to the preferred embodiment, the AMGI_MAT has AMG_ID (Audio Manager Identifier), RTRWI_EA (End Address of RTRWI), AMGI_EA (End Address of TRT_AMGI), VERN (Version Number), and OTBL_SA. The OTBL_SA comprises start addresses of the information tables except AMGI_MAT. In particular, the OTBL_SA includes start addresses for AUDFIT (Audio File Information Table), ASVFIT (Audio Still Video File Information Table), ORG_PGCIT (Original PGC Information Table), UD_PGCIT (User Defined PGC Information Table), TXT_DT_MG (Text Data Manager Table), and MNFIT (Manufacturer's Information Table).

As shown in FIG. 7, the start addresses are denoted by AUDFIT_SA (for AUDFIT), ASVFIT_SA (for ASVFIT), ORG_PGCIT_SA (for ORG_PGCIT), UD_PGCIT_SA (for UD_PGCIT), TXT_DT_MG_SA (for TXT_DT_MG), and MNFIT_SA (for MNFIT), respectively. Preferably, each start address may be represented by a relative byte number from the beginning of the navigation data table of FIG. 1. Alternatively, the start addresses may be represented by using relative byte number or displacement from any arbitrary starting address of the memory or the recording medium.

In the navigation data file configured as above, each information table can be accessed by only reading out its own start address from the OTBL_SA of the first information table or AMGI_MAT and referencing the address.

Figure 8:
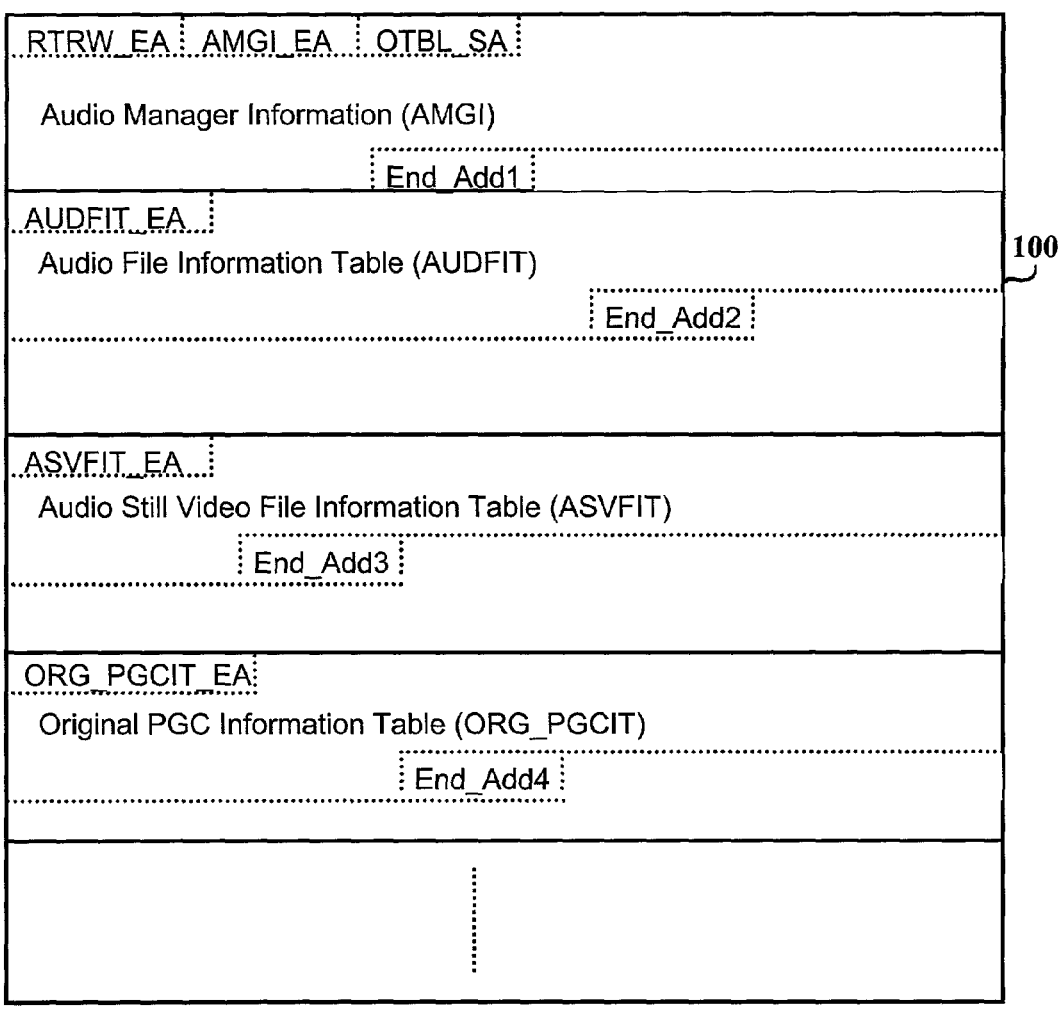
FIG. 8 is a schematic diagram illustrating the process of writing audio object information and audio object presentation order information to information tables of the audio navigation data table having a structure according to the present invention.

FIG. 8 is a schematic diagram illustrating the process of writing audio object information and audio object presentation order information to information tables of the audio navigation data table 100 having a preferred structure according to the present invention. Because of the availability of the start addresses of various data files, each information table need not be arranged contiguously on the memory or the recording medium, as in the prior navigation data structure. For example, the start addresses in the OTBL_SA of the AMGI_MAT file may be chosen such that the information tables in the navigation data are arranged apart to each other with a predetermined spacing (which is denoted as a shaded area in each information table of FIG. 8). As a result, it is possible to write data into one or more of the corresponding information tables without moving back or readjusting the location of the information tables thereafter in order to make sufficient space for the additional data.

Alternatively, the navigation data structure according to the present invention may be structured to place the information tables in a contiguous manner without any extra space between each information table. In this regard, when additional navigation data is written into one of the information tables, the starting addresses of the information tables must be updated. In this case, however, it requires no manipulation of the end addresses of the preceding information tables to access the updated information tables.

Figure 9:
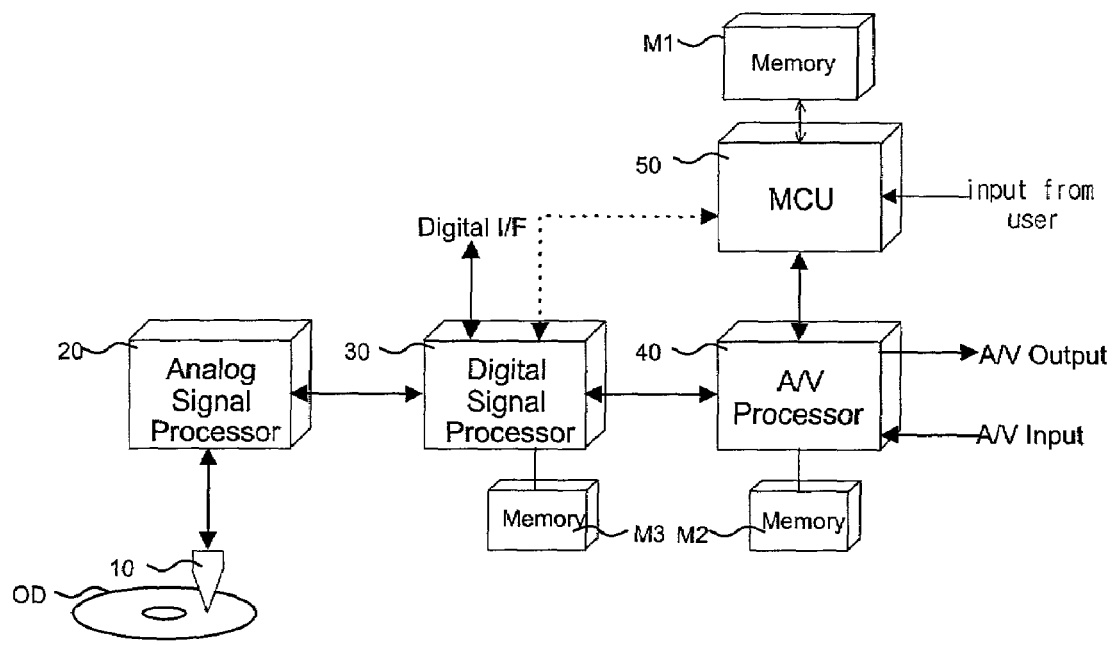
FIG. 9 is a schematic diagram of an optical disc recording/reproduction apparatus embodying the present invention.

Referring to FIG. 9, the player comprises an optical pickup 10 for writing/reading information to/from an optical recording medium; an analog signal processing unit 20 for filtering and digitizing high-frequency analog signals reproduced from the recording medium and converting digital data to be recorded on the recording medium into analog signals; a digital signal processing unit 30 for decoding and encoding digital data and yielding a control signal for data synchronism; an A/V data processing unit 40 for decoding audio/video input data, hereinafter referred to simply as A/V data and encoding audio/video input signals into A/V data; a control unit 50 for controlling general operation of the player in response to a user's requests; and a plurality of memories M1, M2, and M3 for storing temporary data created in each signal processing step. The navigation data file from the video navigation data table 10 of FIG. 1 is preferably loaded into the memory M1.

When recording a moving or still picture (or audio or audio for still-video) on the recording medium in the player of FIG. 9, first, the control unit 50 loads the navigation data file recorded on the recording medium into the memory M1. Referring to the loaded navigation data, the control unit 50 records the picture data on the recording medium, creates management information composed of M_VOBIs or S_VOBIs and CIs corresponding to the VOBs forming the picture file, and writing the management information into the navigation data in the memory M1.

Figure 3:
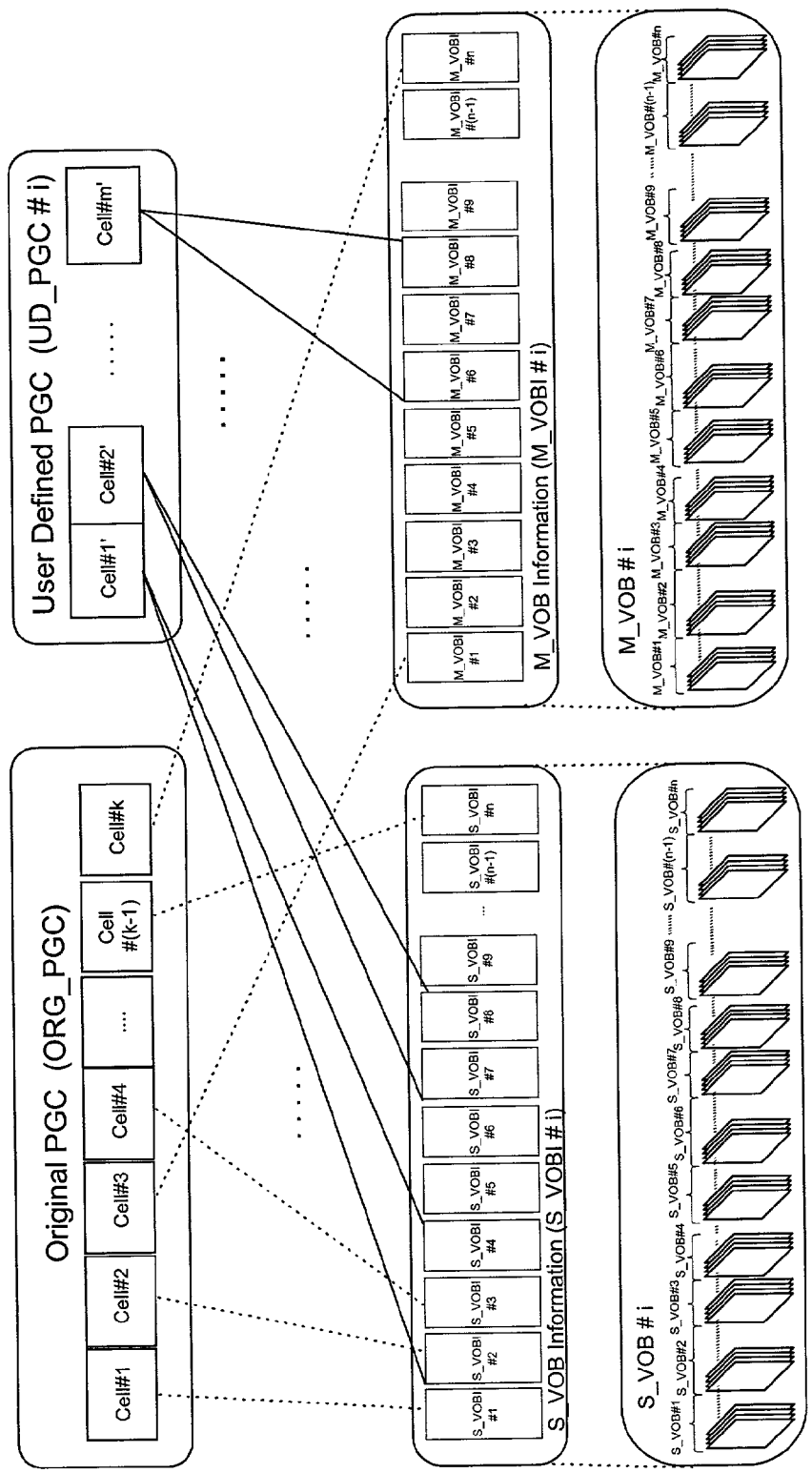
FIG. 3 is a schematic diagram explaining the mechanism of creating and handling management information in the navigation data file of FIG. 1 during recording, editing, and reproduction of moving or still pictures.
Figure 4A:
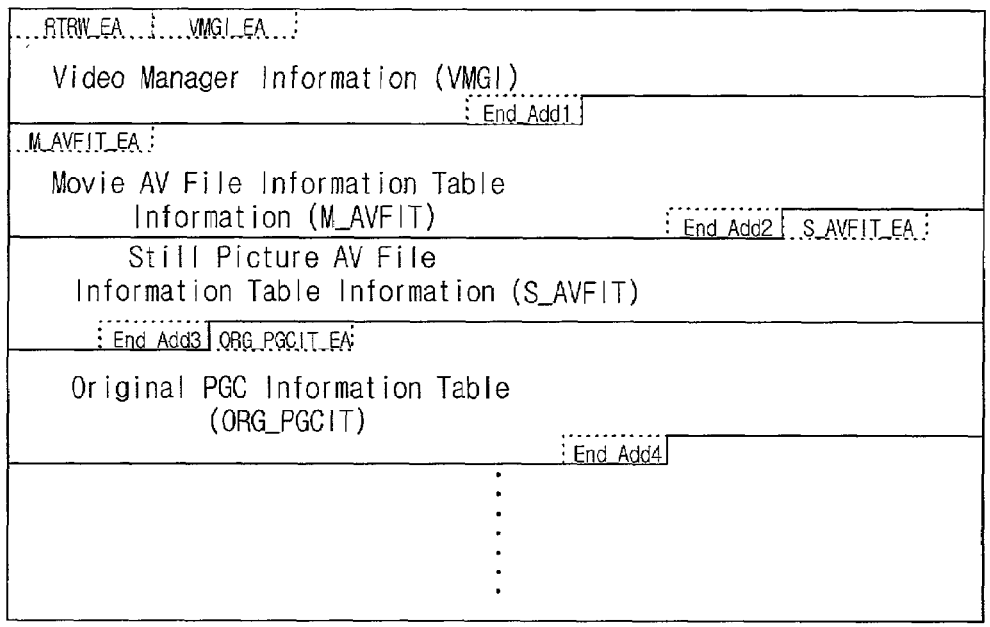
FIGS. 4A and 4B are schematic diagrams illustrating the process of writing video object information and video object presentation order information, which are created by writing of the data to the rewritable recording medium, to information tables in the navigation data file of the prior art.
Figure 4B:
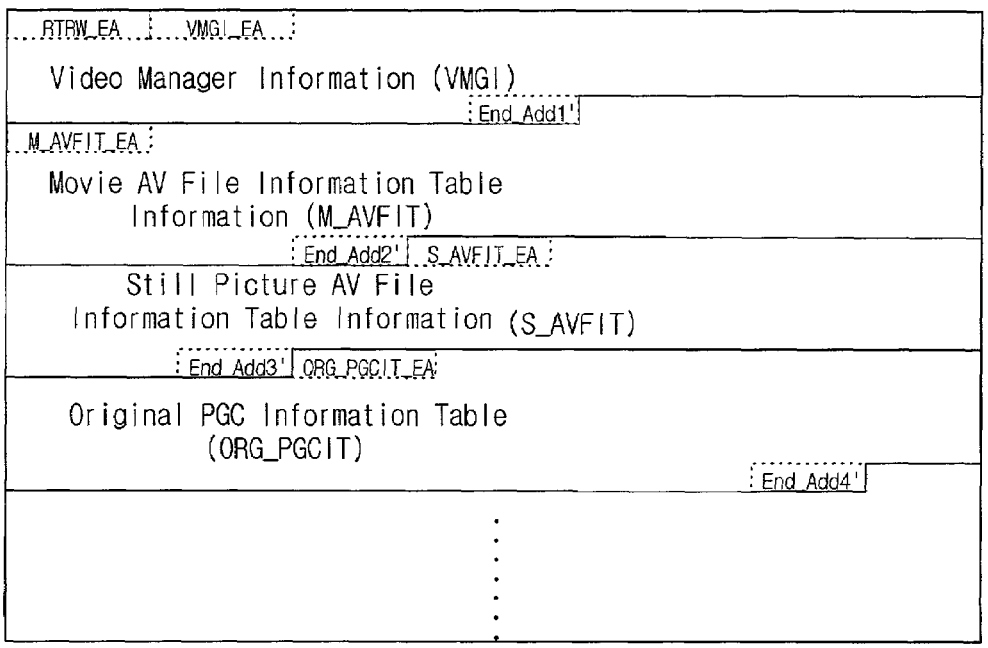

To be specific, in case where moving pictures (or audio data) are written to the recording medium, the control unit 50 generates a series of M_VOBIs, i.e., M_VOBI#1~M_VOBI#n (or AOBIs) in FIG. 3, corresponding to a series of M_VOBs (or AOBs) to be written, i.e., M_VOB#1~M_VOB#n in FIG. 3. Then, with respect to the video data, the control unit 50 reads out the start address of M_AVFIT, or M_AVFIT_SA from VMGI_MAT of VMGI in the video navigation data table 10 (FIG. 1), and then writes the generated M_VOBIs sequentially into M_AVFI of M_AVFIT which is accessed in reference to the M_AVFIT_SA. Moreover, a series of CIs, i.e., C#3, . . . , C#k in FIG. 3, each corresponding to each of the M_VOB#i, is generated by the control unit 50. ORG_PGCIT is accessed by reading the start address of ORG_PGCIT or ORG_PGCIT_SA from VMGI_MAT, and then the series of CIs is preferably written sequentially into ORG_PGCI of the ORG_PGCIT.

The procedure for writing still pictures to the recording medium is similar to that for writing moving pictures. The control unit 50 generates a series of S_VOBIs, i.e., S_VOBI#1~S_VOBI#n in FIG. 3, corresponding to the series of S_VOBs to be written, i.e., S_VOB#1~S_VOB#n in FIG. 3. Then, the control unit 50 reads out the start address of S_AVFIT, or S_AVFIT_SA from the VMGI_MAT of VMGI in the navigation data, and then writes the generated S_VOBIs sequentially into S_AVFI of S_AVFIT which is accessed in reference to the S_AVFIT_SA. And, a series of CIs, i.e., C#1, C#2, . . . , C#(k-1) in FIG. 3, each corresponding to each of the S_VOB#i, is generated by the control unit 50. ORG_PGCIT is accessed by using the start address of ORG_PGCIT or ORG_PGCIT_SA which is kept in VMGI_MAT. Then, the series of CIs are written sequentially into ORG_PGCI of the ORG_PGCIT.

When writing moving or still pictures to the recording medium, it is necessary that the control unit 50 checks whether or not the information tables related to the moving or still pictures have their own reserved writing area enough to contain the corresponding management information. This is because, even though each information table can have its own reserved area initially in the navigation data structure, as shown in FIG. 6, the reserved areas become insufficient as the amount of management information gets large.

For every information table whose reserved area is determined to be insufficient, all information tables after the information table are moved back sequentially on the memory by a predetermined amount, and then the generated management information is written to the newly expanded writing area of the information table. In addition, because the start addresses of the correspondingly relocated information tables have change, corresponding start addresses kept in the OTBL_SA field in VMGI_MAT of VMGI are altered or updated.

When reproduction of moving pictures (or still pictures) recorded on the recording medium is requested, the navigation data file on the recording medium is, first, loaded onto the memory M1. The control unit 50 accesses ORG_PGCIT by obtaining the start address of ORG_PGCIT, or ORG_PGCIT_SA from VMGI_MAT in the loaded navigation data, and then reads out the presentation order information corresponding to the requested VOBs from ORG_PGCI sequentially, i.e., C#1~C#k in FIG. 3. At the same time, M_VOBIs (or S_VOBIs) corresponding to the presentation order information are read out sequentially from M_AVFI (or S_AVFI) in the navigation data after accessing M_AVFIT (or S_AVFIT) by using M_AVFIT_SA (or S_AVFIT_SA) stored in VMGI_MAT. Then, the control unit 50 searches for the requested moving picture (or still picture) on the recording medium and then reproduces them in reference to the CIs and the M_VOBIs (or S_VOBIs).

On the other hand, in case where editing the presentation order of moving pictures (or still pictures) on the recording medium is asked, the navigation data file on the recording medium is loaded onto the memory M1. According to the user's editing of the presentation order of the M_VOBs (or S_VOBs) recorded on the recording medium, the control unit 50 creates a series of CIs representing the new presentation order of the M_VOBs (or S_VOBs), e.g., C#1'~C#m' shown in FIG. 3. Then, the control unit 50 accesses UD_PGCIT by referencing the start address of UD_PGCIT, or UD_PGCIT_SA and writes the new series of the CIs into UD_PGCI of UD_PGCIT. The generated CIs composes a user-defined program chain information (UD_PGC), or a play list, which represents a reproduction order of the relevant M_VOBs (or S_VOBs).

When reproduction is requested according to the edited play list after editing the presentation order, first, the start address of UD_PGCIT or UD_PGCIT_SA which is read out from VMGI_MAT of the navigation data loaded on the memory M1 is used to access the UD_PGCIT, and then the CIs corresponding to the requested play list, i.e., C#1'~C#m' in FIG. 3 is read out from the UD_PGCI of the UD_PGCIT. And, S_AVFIT and M_AVFIT are accessed in reference to S_AVFIT_SA and M_AVFIT_SA stored in VMGI_MAT, respectively. Then, the VOBs corresponding to the CIs, i.e., S_VOBI#2~S_VOBI#4, S_VOB#7~S_VOB#8, . . . , M_VOBI#6~M_VOBI#8 shown in FIG. 3, are read out sequentially from the S_AVFI and M_AVFI. Based on the CIs and VOBIs, the VOBs corresponding to the requested play list are read out from the recording medium and then reproduced.

For recording audio file in the recording medium, the control unit 50 records the data on the recording medium OD shown in FIG. 9, creates management information including AOBIs (Audio Object Information) or ASVOBIs (Audio Still Video Object Information) and CIs corresponding to the AOBs (Audio Objects) forming the audio file, and writing the management information in the navigation data in the memory M1. In this regard, the AOB is audio stream data originated in one real time recording, and AOBU (Audio Object Unit) is a basic unit of an AOB which includes one or more coding blocks and padding data. The ASVOB is audio still video stream data played back with presentation of AOB. ASVOB preferably represents one still picture. The ASVU (Audio Still Video Unit) is a collection of one or more (preferably up to 99) ASVOBs which are presented while one or more tracks are played back. ASVU may be preloaded into memory before starting the presentation of the tracks.

Preferably, the presentation time period of AOBU is a fixed value according to coding and sampling frequency of the audio elementary stream. For example, if the coding scheme is Linear PCM (LPCM) and frequency is 48/96/192 kHz, then the presentation period of AOBU is approximately 1 second.

With respect to the audio file, the control unit 50 reads out the start address of AUDFIT, or AUDFIT_SA from AMGI_MAT of AMGI in the audio navigation data table, and then writes the generated AOBIs sequentially into AUDFI of AUDFIT which is accessed in reference to the AUDFIT_SA. Moreover, a series of audio CIs, i.e., C#3, . . . , C#k similar to ones shown in FIG. 3, each corresponding to each of the AOB#i, is generated by the control unit 50.

The procedure for recording the audio for still-video file (ASVF) to the recording medium is similar to that for recording the audio file. The control unit 50 generates a series of AOBIs, i.e., AOBI#1~AOBI#n (the video counterpart is shown in FIG. 3), corresponding to the series of AOBs to be written, i.e., AOB#1~AOB#n. Then, the control unit 50 reads out the start address of ASVFIT, or ASVFIT_SA from the AMGI_MAT of AMGI in the audio navigation data table, and then writes the generated AOBIs sequentially into ASVFI of ASVFIT which is accessed in reference to the ASVFIT_SA.

A series of CIs, i.e., C#1, C#2, . . . , C#(k-1), each corresponding to each of the AOB#i, is generated by the control unit 50. ORG_PGCIT is accessed by using the start address of ORG_PGCIT or ORG_PGCIT_SA which is stored in AMGI_MAT. Then the series of CIs are written sequentially into ORG_PGCI of the ORG_PGCIT.

When recording audio files to the recording medium, it is necessary that the control unit 50 checks whether or not the information tables related to the audio files have their own reserved writing area sufficient to contain the corresponding management information. This is because, even though each information table has its own reserved area initially in the audio navigation data table 100, as shown in FIG. 8, the reserved areas may become insufficient as the amount of management information increases.

For each information table whose reserved area is determined to be insufficient, all subsequently located information tables are moved back sequentially in the memory by a predetermined amount, and then the generated management information is written to the newly expanded writing area of the information table. In addition, because the start addresses of the correspondingly relocated information tables have changed, corresponding start addresses kept in the OTBL_SA field in AMGI_MAT of AMGI are altered or updated.

When the audio files recorded on the recording medium is reproduced, the audio navigation data file on the recording medium is, preferably loaded in the memory M1. The control unit 50 accesses ORG_PGCIT by obtaining the start address of ORG_PGCIT, or ORG PGCIT SA from AMGI MAT in the loaded audio navigation data, and then reads out the presentation order information corresponding to the requested AOBs from ORG PGCI sequentially, i.e., C#1~C#k. Also, AOBIs (or ASVBIs) corresponding to the presentation order information are read out sequentially from AUDFI (or ASVFI) in the navigation data after accessing AUDFIT (or ASVFIT) by using AUDFIT_SA (or ASVFIT_SA) stored in AMGI_MAT. Then, the control unit 50 searches for the requested audio file (or audio still video file) on the recording medium and then reproduces them in reference to the CIs and the AOBIs (or ASVOBIs).

Where editing of the presentation order of audio files (or audio still video files) on the recording medium is requested, the audio navigation data file on the recording medium is loaded in the memory M1. Pursuant to the user preferred presentation order of the AOBs (or ASVOBs) recorded on the recording medium, the control unit 50 creates a series of CIs representing the new presentation order of the AOBs (or ASVOBs). Then, the control unit 50 accesses UD_PGCIT by referencing the start address of UD_PGCIT, or UD_PGCIT_SA and writes the new series of the CIs into UD_PGCI of UD_PGCIT. The generated CIs compose a user-defined program chain information (UD_PGC), or a play list, which represents a reproduction order of the relevant AOBs (or ASVOBs).

When reproduction is requested according to the edited play list after editing the presentation order, the start address of UD_PGCIT or UD_PGCIT_SA which is read from AMGI_MAT of the audio navigation data table loaded on the memory M1 is used to access the UD_PGCIT. Then, the CIs corresponding to the requested play list, i.e., C#1'~C#m' is read out from the UD_PGCI of the UD_PGCIT. In addition, ASVFIT and AUDFIT are accessed in reference to ASVFIT_SA and AUDFIT_SA stored in AMGI_MAT, respectively. Then, the AOBs corresponding to the CIs, are read from the ASVFI and AUDFI. Based on the CIs and AOBIs, the AOBs corresponding to the requested play list are read from the recording medium and then reproduced.

The method of managing the navigation data in the video or audio navigation data table for the rewritable recording medium according to the present invention is described below in detail with reference to the flow chart shown in FIG. 10.

Figure 10:
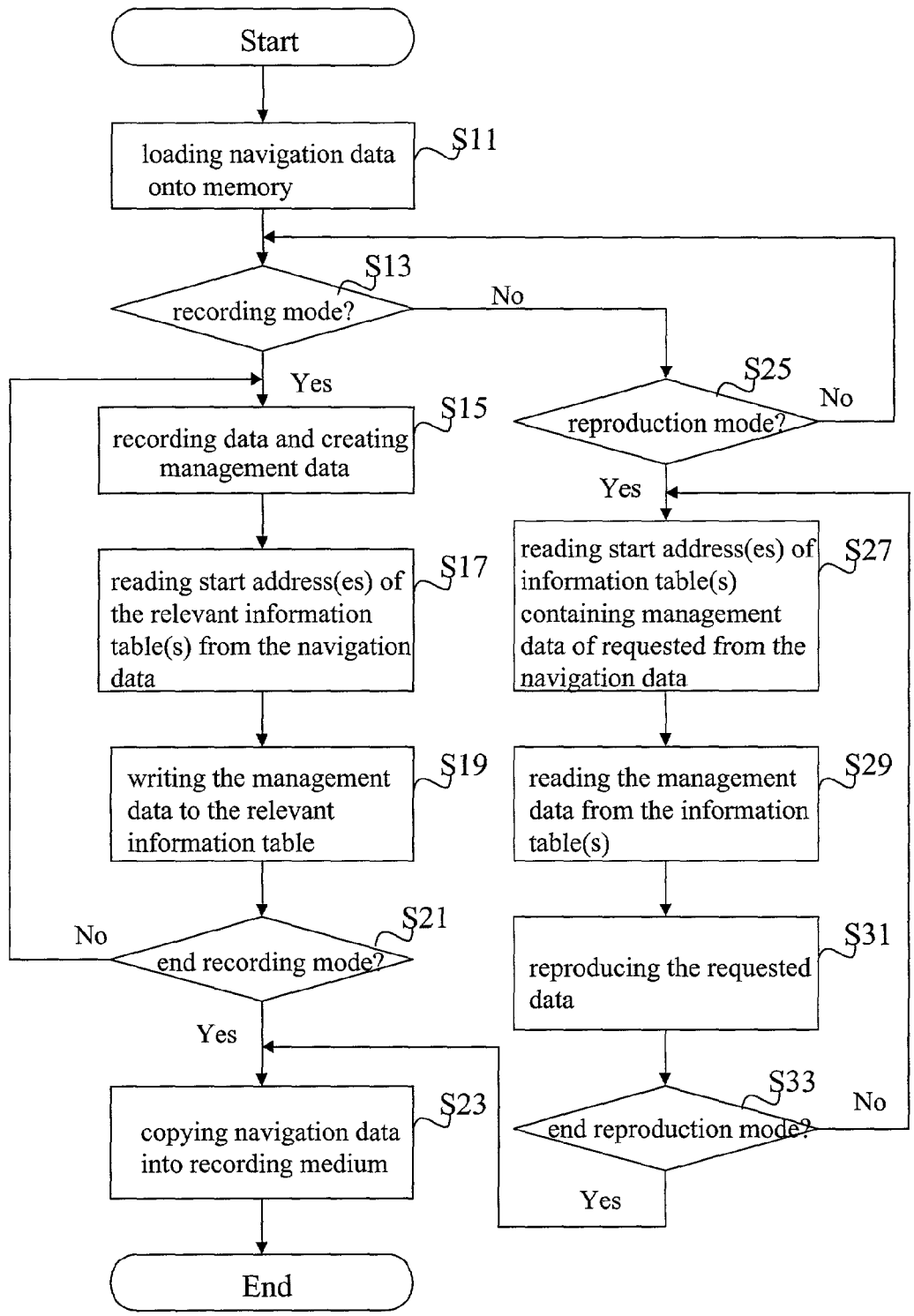
FIG. 10 is a flow chart depicting a management method of the navigation data for a rewritable recording medium according to the present invention.

According to FIG. 10, if a rewritable recording medium is loaded into the player, preferably an optical recorder/player, the control unit 50 reads the navigation data file from the recording medium and stores the file in the memory M1 (S11). Then, the control unit 50 examines whether or not writing moving or still pictures (or audio file) is requested by a user, i.e., recording mode is set (S13).

When it is determined that the player is in the recording mode, the control unit 50 begins execution of a writing control routine, and creates management data corresponding to the data which are written to the recording medium (S15). The VOBIs and CIs compose the management data when moving or still pictures are written to the recording medium. Alternatively, AOBIs and CIs compose the management data when audio files or audio still-video files are written to the recording medium. Then, the control unit 50 reads out the start addresses of the information tables, which are relevant to the generated management data, from VMGI_MAT (or AMGI_MAT) in the navigation data table loaded on the memory M1 (S17). For example, if the management data are M_VOBI and CI, M_AVFIT_SA and ORG_PGCIT_SA are read. Alternatively, for AOBI and CI files, AUDFIT_SA and ORG_PGCIT_SA are read from the recording medium.

Then the control unit 50 accesses the relevant information tables in the navigation data table by using the start addresses obtained in step S17 and then writes the generated management data into the information tables (S19). For example, in case of writing moving pictures to the recording medium, M_AVFIT is accessed by using M_AVFIT_SA and then the relevant M_VOBI is written to M_AVFI of the M_AVFIT. Also, ORG_PGCIT is accessed by ORG_PGCIT_SA and then CI is written to ORG_PGCI of the ORG_PGCIT. Alternatively, when recording audio files to the recording medium, AUDFIT is accessed by using AUDFIT_SA and then the relevant AOBI is written to AUDFI of the AUDFIT.

Once the writing management data into the navigation data is completed, the control unit 50 examines whether to end the recording mode (S21). If not, the above writing processes S15 through S19 are repeated. On the other hand, when the recording mode is determined to have ended, the control unit 50 reads the navigation data contained in the memory M1 and writes the navigation data to the recording medium (S23), thereby completing the writing control routine.

If the recording mode is not set in step S13, the control unit 50 examines whether the reproduction mode is set (S25). If the player is in the reproduction mode, the start addresses of the information tables for the requested data are read from the navigation data table in the memory M1 (S27). By referencing the start addresses, the relevant information tables are accessed and then the management data corresponding to the requested data on the recording medium are extracted from the information tables (S29). For example, if reproduction of moving pictures is requested in a presentation order of original PGC, M_AVFIT_SA and ORG_PGCIT_SA are read out from VMGI_MAT of the video navigation data table, and then M_VOBI and CI are extracted from two information tables or M_AVFIT and ORG_PGCIT. Alternatively, if reproduction of audio file is requested in a presentation order of original PGC, AUDFIT_SA and ORG_PGCIT_SA are read out from AMGI_MAT of the audio navigation data table, and then AOBI and CI are extracted from two information tables or AUDFIT and ORG_PGCIT.

Then, the control unit 50 executes a control routine for reading and reproducing the data recorded on the recording medium (S31). The control unit 50 examines whether or not the reproduction mode has terminated (S33). If not terminated, the above reproduction processes S27 through S31 are repeated. On the other hand, when it is determined that the reproduction mode has terminated, the control unit 50 executes step S23, in which the navigation data contained in the memory M1 are written to the recording medium. This is to preserve management data in the navigation data which may have been changed by editing data and/or changing presentation order in the reproduction mode, thereby completing the control routine.

Although it is primarily described in detail in the foregoing embodiment that information tables on the navigation data such as M_AVFIT, S_AVFIT, ORG_PGCIT, and UD_PGCIT (or AUDFIT, ASVFIT, ORG_PGCIT and UD_PGCIT) are directly accessed by using the start addresses in AMGI_MAT of the navigation data, other information tables such as TXT_DT_MG and MNFIT can be accessed directly in the same way with their own start addresses, such as TXT_MT_MG_SA and MNFIT_SA, respectively.

The management method of the navigation data for a rewritable recording medium according to the present invention provides a faster way of accessing each information table on the navigation data table (video and audio) compared to the prior art method. The present invention also enables to readily locate each information table of the navigation data table due to keeping its own start address, even if the information tables are not contiguously arranged in the memory or the recording medium. Furthermore, instead of loading all of the information tables of the navigation data table onto the memory, as in the prior art method, the present invention makes it possible to load the selected information tables which are currently needed for the requested operation onto the memory, yielding high efficient use of the memory. In this case, each time new operation, reproduction or writing, is requested, it is checked that the information tables relevant to the requested operation are different from the information tables which have been loaded in the memory. It is preferred that the information tables are loaded in the memory only when they are needed.

In the preferred embodiment of the present invention, the rewritable recording medium has either the video or the audio management data table therein. Alternatively, such recording medium may also be recorded with both video and audio management data tables for recording and reproducing both types of data.

The foregoing is provided only for the purpose of illustration and explanation of the preferred embodiments of the present invention, so changes, variations and modifications may be made without departing from the spirit and scope of the invention.

What is claimed is:

1. An audio apparatus for use with a recording medium to record user data thereon, the apparatus comprising:
   a signal pick-up unit to record information onto the recording medium;
   an analog signal processor to produce analog signal from digitize data;
   a digital signal processor to provide the digitized data to the analog signal processor;
   a control unit to record the user data onto at least one data area of the recording medium, wherein the control unit records a navigation data table onto a navigation data area of the recording medium, the navigation data table containing a plurality of navigation information, at least one of the plurality of navigation information being associated with the user data recorded in the data area and at least one of the plurality of navigation information being associated with presentation control information, wherein the navigation data table includes start address information associated with at least one of the plurality of navigation information, and wherein the control unit checks whether a start address of at least one of the plurality of navigation information has been changed and alters the start address information in the navigation data table in response to the change in the start address of at least one of the plurality of navigation information.

2. An audio apparatus according to claim 1, wherein the navigation data table is recorded as a single file.

3. An audio apparatus according to claim 1, wherein the plurality of navigation information recorded in the navigation data area includes an audio file information table.

4. An audio apparatus according to claim 3, wherein the plurality of navigation information recorded in the navigation data area further includes an audio still video information table.

5. An audio apparatus according to claim 1, wherein the presentation control information recorded in the plurality of navigation information comprises:
   a sequential presentation information table containing management information for reproducing data in a recording order; and
   a prescribed-order presentation information table containing management information for reproducing data in a user-defined order.

6. An audio apparatus according to claim 1, wherein each of the start address information of the navigation data table is represented by a relative positional information from the beginning of the navigation data table.

7. A method of creating and writing navigation data on a recording medium, the method comprising the steps of:
   recording user data onto at least one data area of the recording medium;
   recording a navigation data table onto a navigation data area, the navigation data table containing a plurality of navigation information, at least one of the plurality of navigation information being associated with the user data recorded in the data area and at least one of the plurality of navigation information being associated with presentation control information, wherein the navigation data table includes start address information associated with at least one of the plurality of navigation information;
   checking whether a start address of at least one of the plurality of navigation information has been changed; and altering the start address information in the navigation data table in response to the change in the start address of at least one of the plurality of navigation information.

8. A method of claim 7, wherein the navigation data table is recorded as a single file.

9. A method of claim 7, wherein the plurality of navigation information recorded in the navigation data area includes an audio file information table.

10. A method of claim 9, wherein the plurality of navigation information recorded in the navigation data area further includes an audio still video file information table.

11. A method of claim 7, wherein the presentation control information recorded in the plurality of navigation information comprises:
   a sequential presentation information table containing management information for reproducing data in a recording order; and
   a prescribed-order presentation information table containing management information for reproducing data in a user-defined order.

12. A method of claim 7, wherein each of the start address information of the navigation data table is represented by a relative positional information from the beginning of the navigation data table.

13. A method of claim 7, wherein the start address information of the navigation data table includes a start address of a text data manager information table.

14. A method of claim 7, wherein the start address information of the navigation data table includes a start address of a manufacturer's information table.

15. A method of claim 7, wherein the plurality of navigation information comprises:
   an audio file information table;
   an audio still video file information table;
   a sequential presentation information table; and
   a prescribed-order presentation information table.

16. A method of claim 15, wherein the start address information of the navigation data table includes start addresses of the audio file information table, the audio still video file information table, the sequential presentation information table, and the prescribed-order presentation information table.

17. A method of managing navigation data using an audio apparatus and a recording medium, the audio apparatus comprising a signal pick-up unit, an analog signal processor, a digital signal processor and a control unit, the method comprising the steps of:
   providing digitizing data with the digital signal processor;
   producing analog signal with the analog signal processor from the digitize data received from the digital signal processor;
   recording information onto the recording medium with the signal pick-up unit,
   wherein the control unit prepares a navigation data table for recording onto a navigation data area of the recording medium, the navigation data table containing a plurality of navigation information, at least one of the plurality of navigation information being associated with the user data recorded in the data area and at least one of the plurality of navigation information being associated with presentation control information, and wherein the navigation data table includes start address information associated with at least one of the plurality of navigation information, and wherein the control unit checks whether a start address of at least one of the plurality of navigation information has been changed and alters the start address information in the navigation data table in response to the change in the start address of at least one of the plurality of navigation information.

18. A method of claim 17, wherein the plurality of navigation information recorded in the navigation data area includes an audio file information table.

19. A method of claim 18, wherein the plurality of navigation information recorded in the navigation data area further includes an audio still video information table.

20. A method of claim 17, wherein the presentation control information recorded in the plurality of navigation information comprises:
   a sequential presentation information table containing management information for reproducing data in a recording order; and a prescribed-order presentation information table containing management information for reproducing data in a user-defined order.

* * * * *